US011824953B1

(12) United States Patent
Øhrn

(10) Patent No.: US 11,824,953 B1
(45) Date of Patent: Nov. 21, 2023

(54) EXTENDED STATUS INDICATORS FOR MOBILE DEVICE INTERACTIONS

(71) Applicant: Microsoft Technology Licensing, LLC, Redmond, WA (US)

(72) Inventor: Aleksander Øhrn, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/847,931

(22) Filed: Jun. 23, 2022

(51) Int. Cl.
*H04L 67/54* (2022.01)
*H04L 67/52* (2022.01)
*H04L 51/043* (2022.01)
*H04L 51/046* (2022.01)
*H04L 51/222* (2022.01)

(52) U.S. Cl.
CPC ............ *H04L 67/54* (2022.05); *H04L 51/043* (2013.01); *H04L 51/046* (2013.01); *H04L 51/222* (2022.05); *H04L 67/52* (2022.05)

(58) Field of Classification Search
None
See application file for complete search history.

(56) References Cited

U.S. PATENT DOCUMENTS

| | | | | |
|---|---|---|---|---|
| 6,668,173 B2* | 12/2003 | Greene | ................... | H04W 8/14 455/445 |
| 7,603,131 B2* | 10/2009 | Wang | ...................... | H04W 4/02 707/999.005 |
| 7,627,334 B2* | 12/2009 | Cohen | ..................... | H04W 4/02 705/2 |
| 7,823,073 B2* | 10/2010 | Holmes | ................... | H04W 4/02 715/764 |
| 7,958,212 B1* | 6/2011 | Wong | .................... | H04L 51/043 709/224 |
| 7,983,404 B1* | 7/2011 | Croak | .................. | H04L 67/303 709/224 |
| 8,024,431 B2* | 9/2011 | Hoffman | ............... | H04L 65/403 709/224 |
| 8,050,690 B2* | 11/2011 | Neeraj | .................. | H04W 4/185 455/457 |

(Continued)

FOREIGN PATENT DOCUMENTS

| | | |
|---|---|---|
| CN | 106302818 A | 1/2017 |
| CN | 110427572 A | 11/2019 |

OTHER PUBLICATIONS

Betters, Élyse, "'Highlight' App Gives a Name to the Stranger Nearby, Brings Social Network to Life", Retrieved from: https://9to5mac.com/2012/01/24/highlight-app-gives-a-name-to-the-stranger-nearby-brings-social-network-to-life/, Jan. 24, 2012, 4 Pages.

*Primary Examiner* — Backhean Tiv
(74) *Attorney, Agent, or Firm* — NovoTechIP International PLLC

(57) ABSTRACT

A computer-implemented method for extended status indicators can include receiving a signal indicating a first computing device associated with a first user is proximate to a beacon at a particular location; determining a current status of the first user associated with the first computing device; generating an updated status of the first user based on the signal indicating the first computing device is proximate the beacon and the current status of the first user; and directing the updated status to requesting client devices for display as a status indicator of the first user.

18 Claims, 3 Drawing Sheets

(56) References Cited

U.S. PATENT DOCUMENTS

| | | | | |
|---|---|---|---|---|
| 8,250,157 B2* | 8/2012 | Millmore | | H04L 67/54 |
| | | | | 709/204 |
| 8,634,858 B1* | 1/2014 | Jackson | | H04W 4/023 |
| | | | | 709/201 |
| 8,700,048 B2* | 4/2014 | Kamdar | | H04W 4/029 |
| | | | | 455/418 |
| 8,774,145 B2* | 7/2014 | Lin | | H04W 4/21 |
| | | | | 370/338 |
| 8,995,911 B2* | 3/2015 | Nousiainen | | G06Q 10/10 |
| | | | | 455/412.2 |
| 9,218,363 B2* | 12/2015 | Zwaal | | H04L 67/01 |
| 9,432,808 B1* | 8/2016 | Reyes | | G06Q 50/205 |
| 9,488,487 B2* | 11/2016 | Andersen | | G01C 21/3617 |
| 9,510,142 B2* | 11/2016 | Hans | | H04L 61/4594 |
| 9,525,968 B2* | 12/2016 | Pounds | | H04W 4/02 |
| 9,661,091 B2* | 5/2017 | Dawoud Shenouda Dawoud | | |
| | | | | H04L 47/808 |
| 9,680,529 B2 | 6/2017 | Coelho et al. | | |
| 9,706,364 B2* | 7/2017 | Kay | | G01C 21/206 |
| 9,832,748 B1* | 11/2017 | Broum | | H04W 56/002 |
| 9,860,685 B1* | 1/2018 | White, Jr. | | H04L 67/535 |
| 9,876,867 B2* | 1/2018 | Healey | | G06Q 50/01 |
| 9,886,727 B2* | 2/2018 | Curtis | | G06Q 30/0261 |
| 10,004,056 B2* | 6/2018 | Khan | | G01S 5/0009 |
| 10,007,355 B2 | 6/2018 | Schorsch et al. | | |
| 10,009,868 B1* | 6/2018 | Reyes | | G06Q 30/0261 |
| 10,206,065 B2* | 2/2019 | De Vries | | H04L 67/54 |
| 10,332,168 B2* | 6/2019 | He | | G06Q 30/0643 |
| 10,367,911 B1* | 7/2019 | Combs | | H04W 4/029 |
| 10,382,382 B2* | 8/2019 | Chae | | H04L 51/52 |
| 10,587,558 B2* | 3/2020 | Karimli | | H04L 67/54 |
| 10,818,119 B2* | 10/2020 | Robertson | | G07C 9/28 |
| 11,051,130 B2* | 6/2021 | Crowley | | H04L 51/00 |
| 11,074,613 B2* | 7/2021 | McDevitt | | H04W 4/023 |
| 11,206,506 B2* | 12/2021 | Gorsica | | H04W 4/12 |
| 11,223,699 B1* | 1/2022 | Niewczas | | G06F 3/167 |
| 11,540,103 B2* | 12/2022 | Gaver | | H04L 12/4641 |
| 2002/0077080 A1* | 6/2002 | Greene | | H04W 8/14 |
| | | | | 455/412.1 |
| 2006/0099911 A1* | 5/2006 | Shibuya | | H04W 60/00 |
| | | | | 455/435.1 |
| 2007/0043828 A1* | 2/2007 | Famolari | | H04L 51/214 |
| | | | | 709/219 |
| 2007/0130260 A1* | 6/2007 | Weintraub | | H04L 51/043 |
| | | | | 709/204 |
| 2008/0242231 A1* | 10/2008 | Gray | | H04L 67/04 |
| | | | | 455/66.1 |
| 2009/0052442 A1* | 2/2009 | Chen | | H04L 65/1069 |
| | | | | 370/389 |
| 2010/0205242 A1* | 8/2010 | Marchioro, II | | H04W 4/02 |
| | | | | 709/204 |
| 2011/0264528 A1* | 10/2011 | Whale | | H04L 67/025 |
| | | | | 705/347 |
| 2015/0339461 A1* | 11/2015 | Min | | H04W 12/03 |
| | | | | 726/28 |
| 2016/0086228 A1* | 3/2016 | Babb | | G06Q 30/0243 |
| | | | | 705/14.64 |
| 2016/0100282 A1* | 4/2016 | Pounds | | H04W 4/80 |
| | | | | 455/456.1 |
| 2016/0110467 A1* | 4/2016 | Hern | | G06F 16/9554 |
| | | | | 235/375 |
| 2016/0132917 A1* | 5/2016 | Carney, II | | G06Q 30/0261 |
| | | | | 705/14.12 |
| 2017/0025861 A1* | 1/2017 | Lee | | H04L 12/2803 |
| 2017/0171754 A1* | 6/2017 | South | | H04W 12/06 |
| 2017/0270783 A1* | 9/2017 | Mendiola | | G06Q 30/0261 |
| 2018/0095606 A1* | 4/2018 | Chae | | H04L 51/52 |
| 2020/0036831 A1* | 1/2020 | Kim | | H04L 67/306 |

* cited by examiner

EXTENDED STATUS INDICATORS FOR MOBILE DEVICE INTERACTIONS

BACKGROUND

Status indicators are useful graphical user interface elements to enable a user to obtain information on underlying actions of a computing device and on activities of other users with respect to their computing devices. For example, online status indicators can provide information on whether a user is or was recently online or operating a particular application.

Collaboration platforms and social media platforms use online status indicators to assist with interactions between users of those platforms in an effort to support online engagement and coordination. Common online status indicators, particularly for collaboration platforms, include available, busy, offline, and do not disturb. There has been effort to improve the ability of status indicators to indicate whether a user is truly available for interaction or simply online or working, for example, by providing options a user can manually select to appear away or offline or by incorporating artificial intelligence for evaluating user patterns and predicting whether a user is available or busy. However, there continues to be areas for improvement.

BRIEF SUMMARY

Extended status indicators for mobile device interactions are described. The described status indicators can assist with collaboration and engagement not only online via collaboration and social media platforms, but also "offline" (e.g., for in-person interactions).

A computer-implemented method for extended status indicators can include receiving a signal indicating a first computing device associated with a first user is proximate to a beacon at a particular location; determining a current status of the first user associated with the first computing device; generating an updated status of the first user based on the signal indicating the first computing device is proximate the beacon and the current status of the first user; and directing the updated status to requesting client devices for display as a status indicator of the first user.

Determining the current status of the first user associated with the first computing device can include receiving activity information from the first computing device or a second computing device associated with the first user. The activity information from the first computing device can indicate an application state of an application or operation of a phone service of the first computing device. The activity information from the second computing device can indicate an application state of an application such as a collaboration or social media application on the second computing device.

In some cases, the method for extended status indicators can further include receiving a second signal indicating the first computing device associated with the first user is proximate to a second beacon at a second particular location. In some of such cases, generating the updated status of the first user based on the signal indicating the first computing device is proximate to the beacon and the current status of the first user further uses the second signal (and potentially additional beacon signals received within a certain period of time) to determine which status indicator applies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Extended status indicators for mobile device interactions are described. The described status indicators can assist with collaboration and engagement not only online via collaboration and social media platforms, but also "offline" (e.g., for in-person interactions).

Online services, such as social networking services (e.g., LinkedIn, Facebook, etc.), allow users to communicate with each other online, either through public conversations (e.g., posting comments, replying to comments, etc.), or through private conversations using direct messaging. Similarly, online services, such as collaboration services (e.g., Teams, Slack, Microsoft365, Google Workspace, etc.), allow users to collaborate and communicate with each other online through group channels, private conversations (e.g., via direct messaging, email, etc.), and comments (e.g., on documents).

To encourage conversations between users and/or assist with productivity, presence indicators that indicate a user's status (e.g., online, offline, or available to receive a notification) are presented by the online service. The presence indicators allow users of the online service to easily determine whether another user is online and available to converse, which may increase the likelihood of the users engaging in a private or public conversations and/or improve workflow.

As mentioned, presence indicators are often used for indicating online accessibility to the person. However, the described extended status indicators can convey additional information about a user's online availability as well as provide information regarding in-person and/or informal approachability.

Figure 1A:
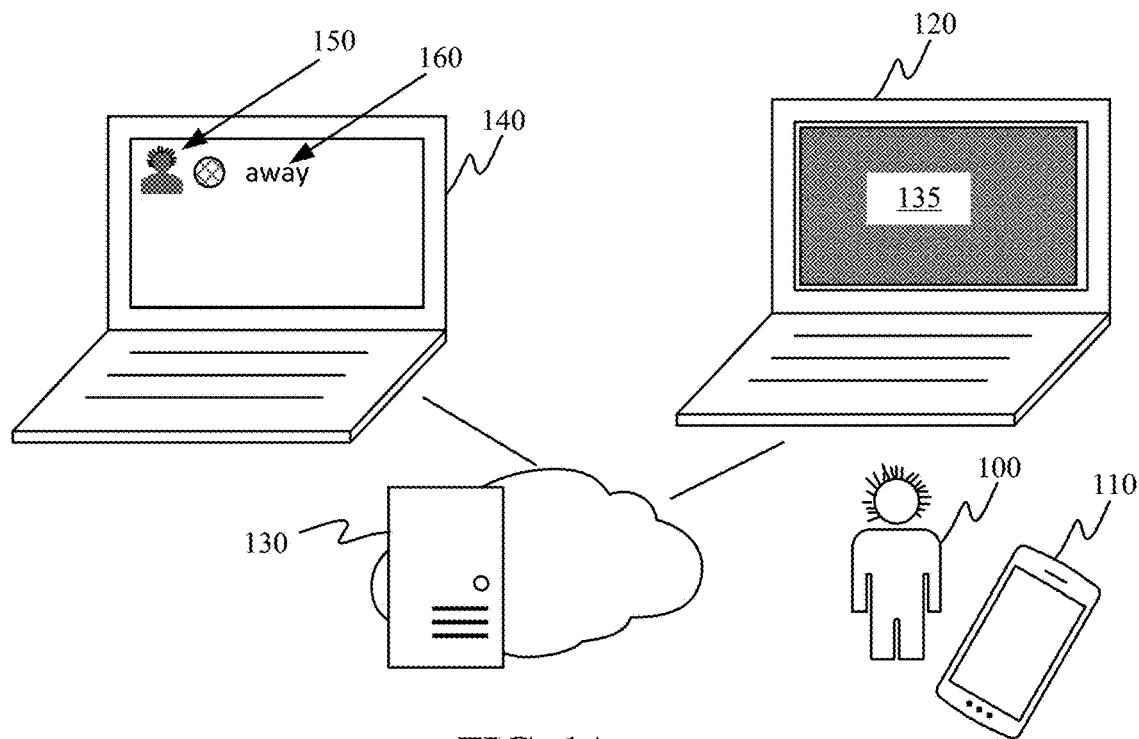
FIGS. 1A and 1B illustrate an example scenario of extended status indicators.
Figure 1B:
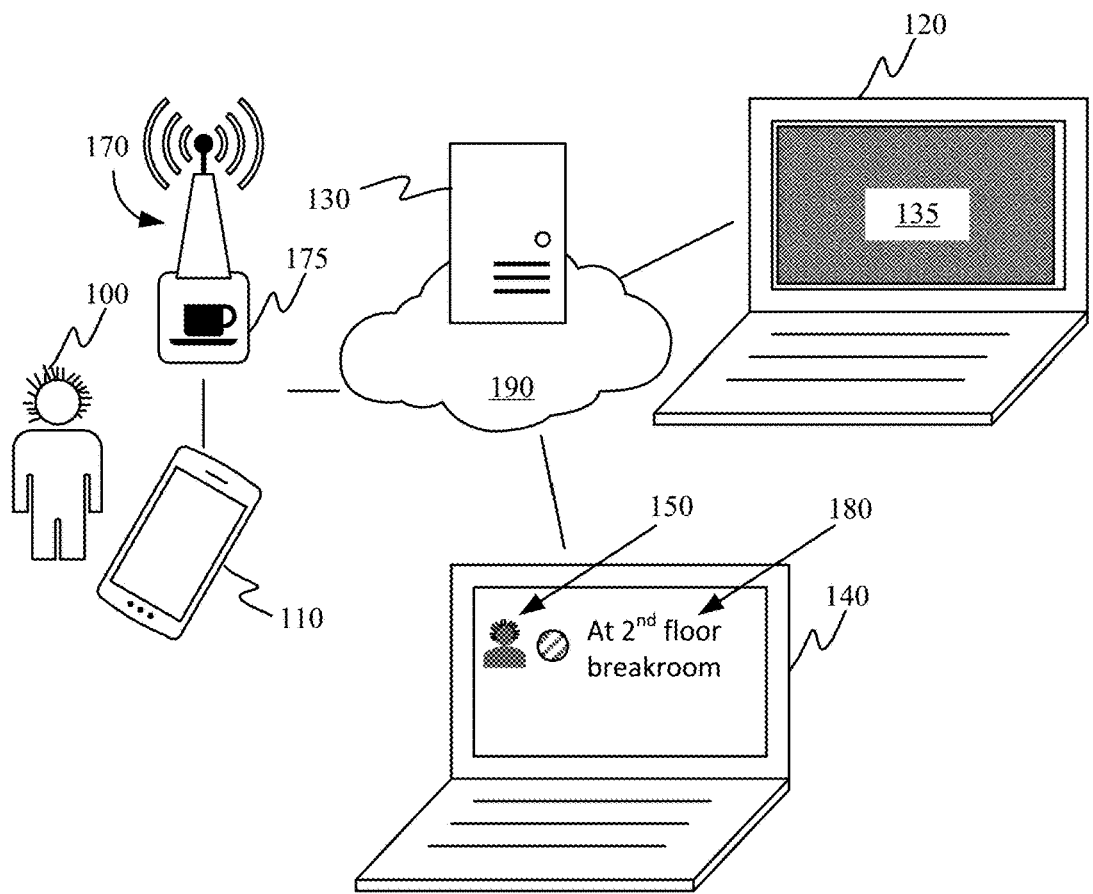

FIGS. 1A and 1B illustrate an example scenario of extended status indicators. Referring to FIG. 1A, a first user 100 can have a first computing device 110 and a second computing device 120. The first computing device 110 and the second computing device 120 may be implemented such as described with respect to system 300 of FIG. 3. For example, the first computing device 110 can be a mobile device such as a mobile phone and the second computing device 120 can be a mobile device such as a laptop computer.

In the illustrative scenario, the first user 100 steps away from their second computing device 120, which had been running an application associated with an online service 130. The second computing device 120 (and/or the application associated with the online service 130) may be considered to have gone inactive (e.g., reflected by a sleep screen 135 in the display of the second computing device 120). A second user (not shown) who is using a third computing device 140 (e.g., implemented such as described with respect to system 300 of FIG. 3) running an application associated with the online service 130 can receive information of the online availability of the first user 100 from the online service 130.

For example, when a user indicator is present on the display of a client computing device of the online service (e.g., third computing device 140), the client computing device determines the presence status of the corresponding user(s) and presents presence indicator(s) indicating the determined presence status(es). The client computing device can determine the presence status of a user by transmitting a request to the online service 130 (e.g., a server of the online service, which may be embodied on a system 400 such as described with respect to FIG. 4) for the presence status. The online service 130 receives the request and returns the requested user's presence status, which is then presented on the display at the client computing device. The online service 130 may directly provide presence services or may utilize available presence services, which communicate with client computing devices to determine whether the user is online, away from their computer, in a meeting, offline, etc.

As illustrated in FIG. 1A, in a display at a client computing device of the online service (e.g., third computing device 140), a presence indicator can be presented near or along with corresponding user indicators that identify users of the online service 130. For example, a user indicator may be a profile picture of the user, a listing of the user's name, etc. A presence indicator presented near or along with a corresponding user indicator indicates the status of the user of the online service that is represented by the user indicator. In the example scenario shown in FIG. 1A, the user indicator 150 representing the first user 100 is shown with a presence indicator 160 of "away".

Turning to FIG. 1B, the first user 100 may have left with their first computing device 110 to get a cup of coffee. Beacons at known locations can be used to detect the presence of a user and automatically change the user's status/broadcast the status. A beacon, in the context of location-based services, is a small hardware device that enables data transmission to mobile devices within a specific range of the device. A beacon is a wireless device that broadcasts its presence (e.g., transmits a unique identifier) over a radio transmitter (e.g., Wi-Fi, Bluetooth, etc.). A radio-equipped device (e.g., phone, gateway, access point) can detect a beacon when the device is in range. In some cases, the beacon for a location can be implemented using any suitable computing device.

In the illustrative scenario, when the first user 100, and particularly the first computing device 110, is proximate a beacon 170 at a coffee area 175 (e.g., within a radius sufficient for beacon 170 and first computing device 110 to detect and/or communicate with each other), a communication between the first computing device 110 and the beacon 170 can occur and a signal is sent to the online service 130 indicating that the first computing device 110 associated with the first user 100 is proximate to the beacon 170 at the particular location (e.g., coffee area 175). In some cases, the signal indicating the first computing device 110 associated with the first user 100 is proximate to the beacon 170 at the particular location is sent to the online service 130 by the first computing device 110 (e.g., when the first computing device 110 is running the application associated with the online service 130). When the signal is sent by the first computing device 110, the communication between the beacon 170 and the first computing device 110 (e.g., from the beacon 170 to the first computing device 110) can include a beacon identifier or other location information.

In some cases, the signal indicating the first computing device 110 associated with the first user 100 is proximate to the beacon 170 at the particular location is sent to the online service 130 by the beacon 170. When the signal is sent by the beacon 170, the communication between the beacon 170 and the first computing device 110 (e.g., from first computing device 110 to the beacon 170) can include information of the first user 100 (e.g., a user identifier of the first user 100 or a device identifier that the online service may use to identify the first user 100). In some of such cases, such as when a user opts-in to enable such communications, the first computing device 110 also provides certain operation information to the beacon 170 that can indicate activity information of the first computing device 110 (e.g., operation of a phone service of the first computing device 110, an application state of an application on the first computing device 110, calendar information, online meeting information, etc.).

Figure 2:
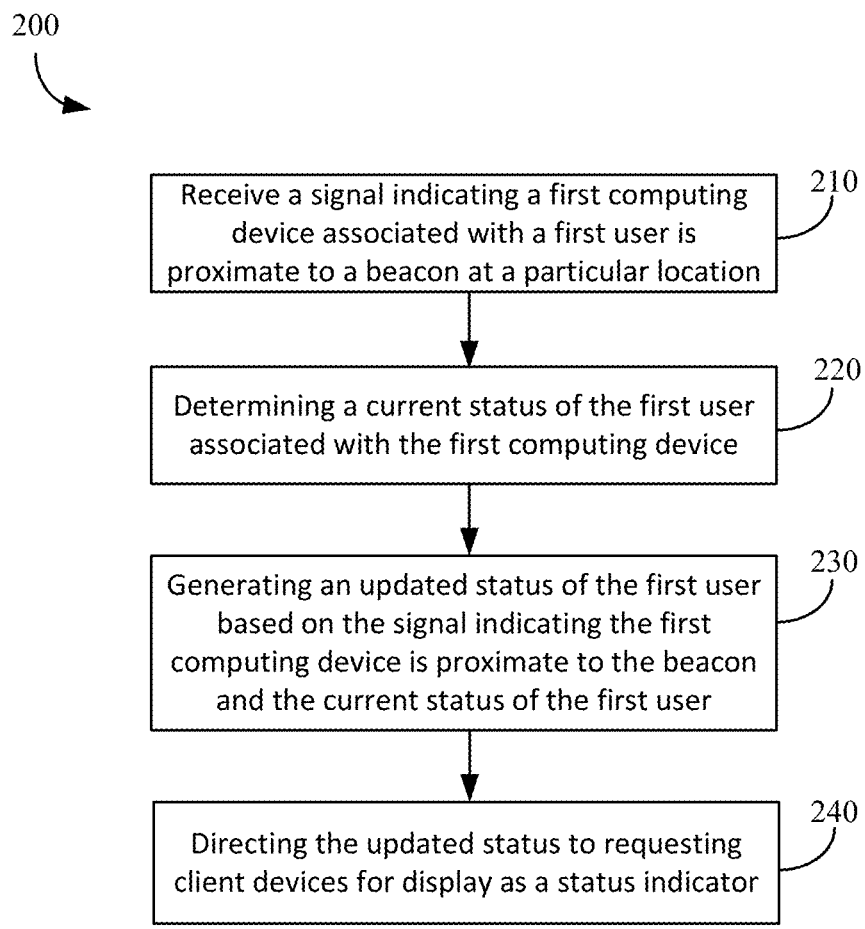
FIG. 2 illustrates a method for extended status indicators.

As described in more detail with respect to FIG. 2, the online services 130 can determine, based on the signals received associated with the first user 100, that the first user has an extended status available and that the extended status should indicate that the first user is proximate the coffee area 175 (labeled in the illustrative scenario as the $2^{nd}$ floor breakroom).

Thus, when a user indicator is present on the display of a client computing device of the online service (e.g., third computing device 140), the client computing device determines the presence status of the corresponding user(s) and presents presence indicator(s) indicating the determined presence status(es), which can include the extended statuses. In the example scenario shown in FIG. 1B, the user indicator 150 representing the first user 100 is shown with a presence indicator 180 of "at $2^{nd}$ floor breakroom".

In this manner, if another user (e.g., the second user) sees the status change to indicate that the first user 100 is at the breakroom, that other user may go get a cup of coffee or otherwise visit the break area in hopes of talking to the first user, supporting offline interactions.

Communications between the first computing device 110 and online service 130, the second computing device 120 and online service 130, third communications device and online service 130, and beacon 170 and online service 130 may be carried out over network 190.

Network 190 can include, but is not limited to, a cellular network, a satellite network, the Internet, a local area network (LAN), a wide area network (WAN), a WiFi network, an ad hoc network, or a combination thereof. The network 190 may include one or more connected networks (e.g., a multi-network environment) including public networks, such as the Internet, and/or private networks such as a secure enterprise private network. Access to the network 190 may be provided via wired and/or wireless means as will be understood by those skilled in the art. As will also be appreciated by those skilled in the art, communication networks can take several different forms and can use several different communication protocols.

FIG. 2 illustrates a method for extended status indicators. Referring to FIG. 2, a computer-implemented method 200 for extended status indicators can include receiving (210) a signal indicating a first computing device associated with a first user is proximate to a beacon at a particular location; determining (220) a current status of the first user associated with the first computing device; generating (230) an updated status of the first user based on the signal indicating the first computing device is proximate the beacon and the current status of the first user; and directing (240) the updated status to requesting client devices for display as a status indicator of the first user.

Receiving (210) the signal indicating the first computing device associated with the first user is proximate to a beacon at a particular location can include receiving a string naming the particular location and a first identifier associated with the first user. In some cases, receiving (210) the signal indicating the first computing device associated with the first user is proximate to a beacon at a particular location includes receiving an identifier of the particular location and a first identifier associated with the first user. In some of such cases, a look-up is performed of a string naming the particular location using the identifier of the particular location. The string naming the particular location can be used as part of an extended status identifier.

As previously mentioned, the signal indicating the first computing device associated with the first user is proximate to a beacon at a particular location can be received from the beacon itself or the first computing device, depending on implementation.

Determining (220) the current status of the first user associated with the first computing device can include receiving activity information from the first computing device, a second computing device associated with the first user, or both the first computing device and the second computing device).

For example, determining (220) the current status of the first user can include receiving activity information from the second computing device associated with the first user and assigning the current status of the first user based on the received activity information from the second computing device. The second computing device associated with the first user can have a collaboration or social media application stored thereon and it is the application state of the collaboration or social media application that is indicated by the activity information. In some cases, the first computing device associated with the first user and the second computing device associated with the first user are executing a same application.

As another example, determining (220) the current status of the first user can include receiving activity information from the first computing device; and assigning the current status of the first user based on the received activity information. Similar to activity information that may come from the second computing device, the activity information from the first computing device can indicates an application state of an application such as a collaboration application, social media application, and even a messaging application. In some cases, the activity information from the first computing device indicates operation of a phone service of the first computing device. When the activity information indicates operation of the phone service, the current status of the first user can be assigned as busy when the phone service is being used and can be assigned as available when the phone service is not being used. A similar response could be made based on network operation of the first computing device (e.g., amount of cellular or network data, which may be indicative of heavy usage of the device).

Since it is not uncommon for a user to be signed in to an application associated with an online service using many devices at the same time, any existing or otherwise suitable mechanism by which to aggregate the user's presence information may be used by the online service to determine a current status.

Generating (230) the updated status of the first user based on the signal indicating the first computing device is proximate the beacon and the current status of the first user can include determining whether an extended status is available or is blocked for the first user in view of the current status. An extended status can be determined to be available if conditions regarding the current status indicate that the user may want to have their physical location advertised; and an extended status can be determined to be blocked if the conditions regarding the current status indicate that the user would not want to have their physical location advertised. For example, if a user is on a phone call, the extended status can be determined to be blocked. Of course, a user can expressly indicate that they are not to be disturbed (even when opted in to the service providing extended statuses and otherwise could be considered to be available for extended status).

The system performing the method 200 can include machine learning/artificial intelligence components to assist with the determination of availability of an extended status. These systems may involve generating and training models of behavior of applications, etc., as is known in the art, to identify patterns of signals indicative of whether a user would be available for in-person interruption. In a most simple implementation, a set of logic can be used/developed (e.g., if/then statements) for common scenarios that would reflect the extended status and if the signals do not fall into a recognized category or scenario, the extended status can be determined to be blocked. Information of signals that are not part of the known scenarios can be collected and used to potentially update the logic.

For example, returning to a possible scenario associated with FIGS. 1A and 1B, the first user could be working next to the coffee machine in the coffee area on their main device (e.g., second computing device 120). The first user 100 may not have the first computing device 110 (or not enabled the first computing device for the described purpose). Instead, the second computing device 120 communicates with the beacon 170 to identify proximity. Here, the system could show the location of the break room area if the second computing device 120 (e.g., laptop) has not been active (which could imply that the user is up and getting coffee). Intelligence can be provided that combines multiple signals to determine which status is the most appropriate to show since there could be many valid options. The system may not want to advertise that the user is by the coffee machine unless the system identifies that there is no secondary signal of working/busy.

The purpose of the status indicator can be to show if someone is busy (and where they are) or to indicate approachability or availability at in-person settings such as near an object (e.g., coffee machine) or at a location. For example, current presence indicators may be able to indicate that a user is in a call or on an online meeting, which can imply to someone seeing that indicator that if they need to contact that user, they should either wait or send an email or instant message. They would know that calling or stopping by in person would not get a response. Similarly, if a user is indicated as presenting by a current presence indicator, someone seeing that indicator would know that they probably should not send an instant message in case the user is sharing their screen. The intelligence (whether part of the simple logic or a more complex machine learning implementation) uses this information to make decisions to not advertise the beacon location as it would be likely that the user does not want to be disturbed. Thus, certain signals like being on the phone, being in a meeting, having an appointment on a calendar, and editing a document can indicate that the user would not want to be interrupted in-person (and may be part of defined decision logic).

Accordingly, when generating (230) the updated status of the first user based on the signal indicating the first computing device is proximate the beacon and the current status of the first user, if the extended status is determined to be blocked, generating (230) the updated status includes applying the current status as the updated status of the first user. For example, if the user is indicated as being busy as part of the current status, the updated status can indicate the user is busy.

If the extended status is determined to be available in view of the current status, generating (230) the updated status includes obtaining a status template for the extended status and inserting information of the particular location in a custom field of the status template for the extended status used as the updated status of the first user.

There can be status templates stored by the service (e.g., at or in communication with a server on which the service is provided) that have one or more parameters that can be updated in the template based on the known location and in some cases on the user's activities. For example, a status template can be "hanging near X" or "taking a break at X". Another status template can be eating lunch at "X". The system can determine the template to use based on the location identity, received signals, and user-defined scenarios among other information.

In some cases, the method for extended status indicators can further include receiving a second signal indicating the first computing device associated with the first user is proximate to a second beacon at a second particular location. In some of such cases, generating the updated status of the first user based on the signal indicating the first computing device is proximate to the beacon and the current status of the first user further uses the second signal (and potentially additional beacon signals received within a certain period of time) to determine which status indicator applies. The system receiving the signals from beacons can track the timing between the signals. The timing between the first signal and the second signal (from a different beacon) can be indicative of certain behaviors. Inferencing operations (e.g., using any suitable machine learning algorithm or a simple set of logic if/then statements may be used) can be performed to assist with the status indicator determination.

For example, a beacon A may be located in the office lobby and a beacon B may be located in a parking lot. A first signal can be received indicating the first computing device associated with the first user is proximate beacon A and then a second signal can be received indicating the first computing device associated with the first user is proximate the beacon B. If the timing between the two signals is about a minute, a reasonable inference may be that the first user is about to leave the office. This in turn could translate into a status indicator "Elvis has left the building." As another example, a beacon C may be located in a copy room. Multiple signals received indicating the first computing device associated with the first user is proximate the beacon C (or the beacon C and another one of the beacons) within a period of time (e.g., 5-10 minutes) may generate a reasonable inference that the first user is working away from their desk and is busy (which may contribute to a determination whether an extended status is available or not for that user).

As can be seen, it is possible, through use of an extended status indicator, to assist with collaboration and engagement not only online via collaboration and social media platforms, but also "offline" (e.g., for in-person interactions).

Figure 3:
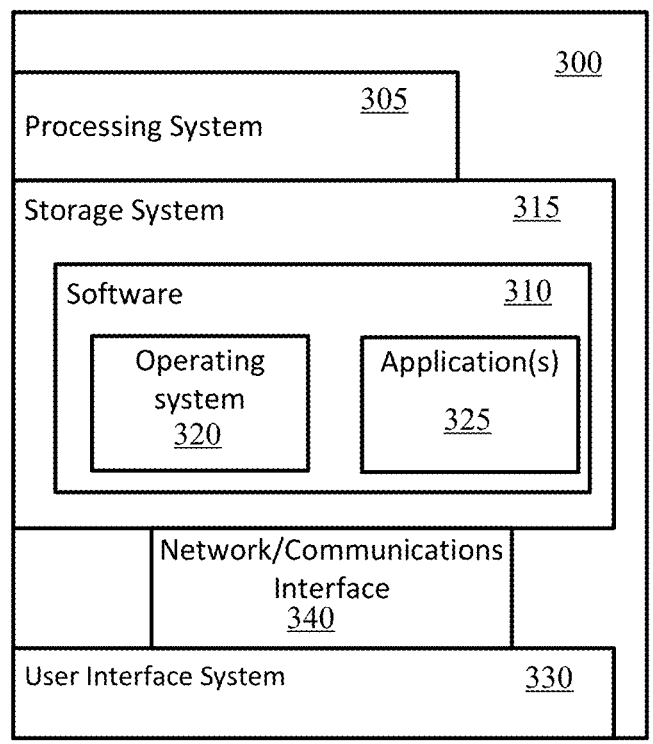
FIG. 3 illustrates components of a computing device that may be used in certain implementations described herein.

FIG. 3 illustrates components of a computing device that may be used in certain implementations described herein.

Referring to FIG. 3, system 300 may represent a computing device such as, but not limited to, a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 300 may be incorporated to implement a particular computing device.

System 300, for example, includes a processing system 305 of one or more processors to transform or manipulate data according to the instructions of software 310 stored on a storage system 315. Examples of processors of the processing system 305 include general purpose central processing units, application specific processors, and logic devices, as well as any other type of processing device, combinations, or variations thereof.

The software 310 can include an operating system 320 and application programs 325 such as an electronic messaging application, a collaboration application, a web browsing application, and/or a social media application, which may communicate with an appropriate online service tracking user presence. Collaboration applications can include, but are not limited to, team collaboration tools that support a variety of communications and content including, but not limited to, one or more of video, audio, text, file attachments, instant messages (e.g., exchanges between two—and sometimes more—people), chat messages (e.g., messaging within a chat room or other virtual meeting area), email, calendar entries, meeting entries, and the like. Examples of team collaboration tools include MICROSOFT TEAMS, SLACK, and FLOWDOCK. Other applications that include at least some meetings, collaboration, and messaging capabilities include FACEBOOK (and FACEBOOK MESSENGER), GOTOMEETING, and JOIN.ME. Collaboration applications can also include MICROSOFT365 and GOOGLE WORKSPACE. Example social media applications include FACEBOOK, INSTAGRAM, and TWITTER.

Device operating systems generally control and coordinate the functions of the various components in the computing device, providing an easier way for applications to connect with lower-level interfaces like the networking interface. The operating system 320 may control phone operation services and network operation services on the system 300.

It should be noted that the operating system 320 may be implemented both natively on the computing device and on software virtualization layers running atop the native device operating system (OS). Virtualized OS layers, while not depicted in FIG. 3, can be thought of as additional, nested groupings within the operating system space, each containing an OS, application programs, and APIs.

Storage system 315 can include any computer readable storage media readable by the processing system 305 and capable of storing software 310 including the various applications 325 that may communicate with an associated online service tracking user presence. Storage system 315 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium of storage system a transitory propagated signal.

Storage system 315 may include additional elements, such as a controller, capable of communicating with processor 305.

The system can further include user interface system 330, which may include input/output (I/O) devices and components that enable communication between a user and the system 300. User interface system 330 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. The user interface system 330 may also include output devices such as display screens, speakers, haptic devices for tactile feedback, and other types of output devices. In certain cases, the input and output devices may be combined in a single device, such as a touchscreen display which both depicts images and receives touch gesture input from the user. Visual output may be depicted on the display in myriad ways, presenting graphical user interface elements, text, images, video, notifications, virtual buttons, virtual keyboards, or any other type of information capable of being depicted in visual form.

The user interface system 330 may also include user interface software and associated software (e.g., for graphics chips and input devices) executed by the OS in support of the various user input and output devices. The associated software assists the OS in communicating user interface hardware events to application programs using defined mechanisms. The user interface system 330 including user interface software may support a graphical user interface, a natural user interface, or any other type of user interface.

Communications interface 340 may include communications connections and devices that allow for communication with other computing systems over one or more communication networks. Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the operating system 320, which informs applications of communications events when necessary.

It should be noted that certain elements of system 300 may be included in a system-on-a-chip (SoC) device. These elements may include, but are not limited to, the processing system 305, a communications interface 340, and even elements of the storage system 315.

Figure 4:
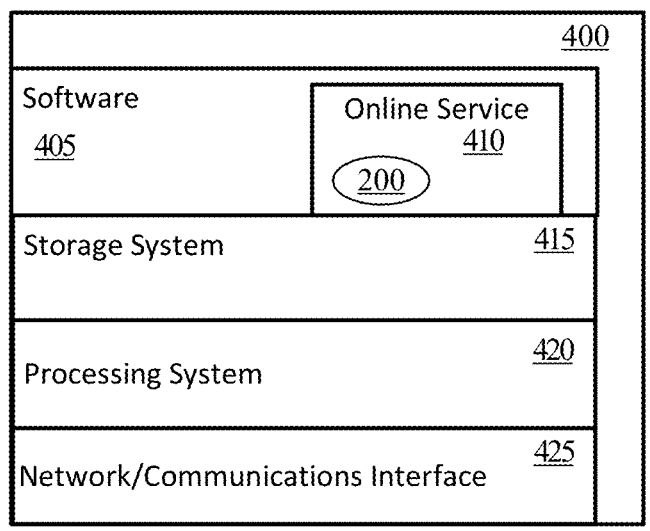
FIG. 4 illustrates components of a computing system that may be used to implement certain methods and services described herein.

FIG. 4 illustrates components of a computing system that may be used to implement certain methods and services described herein. Referring to FIG. 4, system 400 may be implemented within a single computing device or distributed across multiple computing devices or sub-systems that cooperate in executing program instructions. The system 400 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 400 can include a processing system 420, which may include one or more processors and/or other circuitry that retrieves and executes software 405 from storage system 415. Processing system 420 may be implemented within a single processing device but may also be distributed across multiple processing devices or sub-systems that cooperate in executing program instructions.

Examples of processing system 420 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

As with storage system 315 (as shown in FIG. 3), storage system 415 can include any computer readable storage media readable by processing system 420 and capable of storing software 405. Storage system 415 may be implemented as a single storage device but may also be implemented across multiple storage devices or sub-systems co-located or distributed relative to each other. Storage system 415 may include additional elements, such as a controller, capable of communicating with processing system 420.

Software 405 may be implemented in program instructions and among other functions may, when executed by system 400 in general or processing system 420 in particular, direct the system 400 or processing system 420 to operate as described herein for extended statuses. For example, software 405 may provide program instructions that implement an online service 410 that tracks user presence, for example performing method 200 as described with respect to FIG. 2. Online service 410 can support one or more applications (e.g., application(s) 325 described with respect to FIG. 3).

Software 405 may also include additional processes, programs, or components, such as operating system software or other application software. Software 405 may also include firmware or some other form of machine-readable processing instructions executable by processing system 420.

In embodiments where the system 400 includes multiple computing devices, the system can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 425 may be included, providing communication connections and devices that allow for communication between system 400 and other computing systems (e.g., including computing devices 110, 120, and 130 described with respect to FIGS. 1A and 1B) over a communication network or collection of networks (not shown) or the air.

Communication to and from client computing devices, beacons, and other computing systems (not shown) and the online service 410 may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A computer-implemented method for extended status indicators, the method comprising:
    receiving first activity information from a first computing device associated with a first user, the first computing device having a collaboration or social media application stored thereon and a phone service stored thereon;
    receiving second activity information from a second computing device associated with the first user, the second computing device having the collaboration or social media application stored thereon;
    receiving a signal indicating the first computing device associated with the first user is proximate to a beacon at a particular location;
    determining a current status of the first user associated with the first computing device based on the received first activity information from the first computing device and the received second activity information from the second computing device;
    generating an updated status of the first user based on the signal indicating the first computing device is proximate to the beacon and the current status of the first user that was determined based on the received first activity information from the first computing device and the received second activity information from the second computing device, wherein generating the updated status of the first user based on the signal indicating the first computing device is proximate to the beacon and the current status of the first user that was determined based on the received first activity information from the first computing device and the received second activity information from the second computing device comprises combining multiple signals to determine which status of available statuses to show as the updated status; and
    directing the updated status to requesting client devices for display as a status indicator.

2. The computer-implemented method of claim 1, wherein the updated status includes the particular location in a custom field of a status template.

3. The computer-implemented method of claim 1, wherein the first computing device associated with the first user and the second computing device associated with the first user are executing a same application.

4. The computer-implemented method of claim 1, wherein the activity information from the first computing device indicates an application state of the collaboration or social media application.

5. The computer-implemented method of claim 1, wherein the activity information from the first computing device indicates an application state of a messaging application.

6. The computer-implemented method of claim 1, wherein the activity information from the first computing device indicates operation of the phone service of the first computing device; and
    wherein the current status of the first user is assigned as busy when the phone service is being used and is assigned as available when the phone service is not being used.

7. The computer-implemented method of claim 1, further comprising:
    receiving a second signal indicating the first computing device associated with the first user is proximate to a second beacon at a second particular location within a period of time of receiving the signal indicating the first computing device associated with the first user is proximate to the beacon at the particular location;
    wherein generating the updated status of the first user based on the signal indicating the first computing device is proximate to the beacon and the current status of the first user further uses the second signal for the updated status.

8. The computer-implemented method of claim 1, wherein the signal indicating the first computing device associated with the first user is proximate to the beacon at the particular location is received from the first computing device.

9. The computer-implemented method of claim 1, wherein the signal indicating the first computing device associated with the first user is proximate to the beacon at the particular location is received from the beacon.

10. The computer-implemented method of claim 1, wherein the signal indicating the first computing device associated with the first user is proximate to the beacon at the particular location comprises a string naming the particular location and a first identifier associated with the first user.

11. The computer-implemented method of claim 1, wherein the signal indicating the first computing device associated with the first user is proximate to the beacon at the particular location comprises an identifier of the particular location and a first identifier associated with the first user, the method further comprising performing a look-up of a string naming the particular location using the identifier of the particular location.

12. The method of claim 1, wherein generating the updated status of the first user further comprises determining that an extended status is available for the first user in view of the current status, wherein the determining that the extended status is available comprises using machine learning trained on patterns of signals indicative of whether a user is available for in-person interruption.

13. The method of claim 1, further comprising:
   receiving a second signal indicating the first computing device is proximate to a second beacon at a second particular location;
   tracking timing between the signal and the second signal; and
   performing inferencing operations to determine a second updated status based on the timing between the signal and the second signal.

14. One or more computer readable storage media having instructions stored thereon that when executed by a hardware processor, perform a method comprising:
   receiving first activity information from a first computing device associated with a first user, the first computing device having a collaboration or social media application stored thereon and a phone service stored thereon;
   receiving second activity information from a second computing device associated with the first user, the second computing device having the collaboration or social media application stored thereon;
   receiving a signal indicating the first computing device associated with the first user is proximate to a beacon at a particular location;
   determining a current status of the first user associated with the first computing device based on the received first activity information from the first computing device and the received second activity information from the second computing device;
   generating an updated status of the first user based on the signal indicating the first computing device is proximate to the beacon and the current status of the first user that was determined based on the received first activity information from the first computing device and the received second activity information from the second computing device, wherein generating the updated status of the first user based on the signal indicating the first computing device is proximate to the beacon and the current status of the first user that was determined based on the received first activity information from the first computing device and the received second activity information from the second computing device comprises combining multiple signals to determine which status of available statuses to show as the updated status; and
   directing the updated status to requesting client devices for display as a status indicator.

15. The one or more computer readable storage media of claim 14,
   wherein the updated status includes the particular location in a custom field of a status template.

16. A system comprising:
   one or more computer readable storage media;
   one or more processors; and
   program instructions stored on the one or more computer readable media that, when executed by the one or more processors, direct the system to perform a method comprising:
      receiving first activity information from a first computing device associated with a first user, the first computing device having a collaboration or social media application stored thereon and a phone service stored thereon;
      receiving second activity information from a second computing device associated with the first user, the second computing device having the collaboration or social media application stored thereon;
      receiving a signal indicating the first computing device associated with the first user is proximate to a beacon at a particular location;
      determining a current status of the first user associated with the first computing device based on the received first activity information from the first computing device and the received second activity information from the second computing device;
      generating an updated status of the first user based on the signal indicating the first computing device is proximate to the beacon and the current status of the first user that was determined based on the received first activity information from the first computing device and the received second activity information from the second computing device, wherein generating the updated status of the first user based on the signal indicating the first computing device is proximate to the beacon and the current status of the first user that was determined based on the received first activity information from the first computing device and the received second activity information from the second computing device comprises combining multiple signals to determine which status of available statuses to show as the updated status; and
      directing the updated status to requesting client devices for display as a status indicator.

17. The system of claim 16,
wherein the updated status includes the particular location in a custom field of a status template.

18. The system of claim 16,
wherein the activity information from the second computing device indicates an application state of the collaboration or social media application; and
wherein the activity information from the first computing device indicates an application state of an application or operation of a phone service of the first computing device.

* * * * *